United States Patent Office 3,431,176
Patented Mar. 4, 1969

3,431,176
PREPARATION OF URICASE
Juichiro Fukumoto, Takarazuka, and Takehiko Yamamoto, Amagasaki, Japan, assignors to Toyo Boseki Kabushiki Kaisha, Osaka, Japan
No Drawing. Filed Jan. 17, 1967, Ser. No. 609,746
Claims priority, application Japan, Feb. 2, 1966, 41/6,346
U.S. Cl. 195—66   4 Claims
Int. Cl. C12d 13/10

ABSTRACT OF THE DISCLOSURE

Uricase is prepared by cultivating yeast to adaptively produce uricase in the yeast cells, followed by extraction of the uricase from the yeast cells. The extraction procedure is characterized by contacting the cells with an aqueous solution of inorganic salt having an ionic strength higher than 2.0 and a pH of from 3 to 8, and then subjecting the treated cells to suspension in or dialysis against an aqueous solution of inorganic or organic salt having an ionic strength less than 1.0 and a pH of from 7.0 to 11.0 to effect the uricase extraction.

---

This invention relates to a process for preparing uricase from yeast in high yield and purity without disrupting yeast cells.

Uricase is an enzyme to catalytically oxidize uric acid into allantoin and is not found in the tissues of highest order of mammals, particularly human beings but is extensively present in the tissues, particularly internal organs, of lower mammals and also in various microorganisms.

Uricase is utilized as an enzyme for the clinical analysis of the uric acid content in blood and is sometimes used in the treatment of gout, arthritis and other inflammatory diseases caused by excessive accumulation of uric acid.

Uricase has heretofore been prepared mostly from liver of cattle or kidney of hog by extracting these tissues. However, the purification of the extract is so complicated that it is difficult to obtain uricase in a high yield and purity. Further, the raw materials, namely internal organs of animals are expensive and troublesome to handle. For these reasons, the conventional method of preparing uricase from internal organs of animals is costful.

Obviously, if microorganisms can be used as source materials for uricase, the cost of the resulting uricase will be lower than by using animal organs because microorganisms can be cultivated in a large quantity and are easy to handle. However, microorganisms have not industrially been utilized as a source of uricase. This is because, not only for the extraction of uricase but also for the determination of uricase activity, there has been developed no other proper method than by the complete disruption of cells of microorganisms. The cell disruption can be effected only by means of complicated and costful procedure such as ultrasonication or freezing-thawing operations. Even if the cells could be disrupted, the resulting uricase solution contains so much impurities that complicated operations are required for the purification of uricase.

Generally, various microorganisms adaptively or inducibly produce uricase. However, such uricase is formed as an intracellular enzyme and is not secreted out of the cells. Therefore, when microorganisms are used as a source of uricase, it is preferable to select those not only high in the adaptive productivity of uricase but also easy to cultivate yielding a large amount of cells.

From the above points of view, it has been found that yeast is an excellent source of uricase and has further been found that under certain specific conditions uricase can be extracted from yeast cells in high yield and purity without the necessity of cell disruption.

Briefly, the present invention relates to a process for preparing uricase by cultivating yeast to adaptively produce uricase in the yeast cells and extracting uricase from the yeast cells, characterized by contacting the cells with an aqueous solution of inorganic salts having an ionic strength higher than 2.0 and a pH of from 3 to 8, and then subjecting the treated cells to suspension in or dialysis against an aqueous solution of inorganic or organic salt having an ionic strength less than 1.0 and a pH of from 7.0 to 11.0 to effect the uricase extraction.

In carrying out the present invention any yeast which can adaptively or inducibly produce uricase may be used. However, the yeast belonging to *Candida utilis* is preferred.

The yeast may be cultivated in a conventional manner. For example, a strain of *Candida utilis* may be cultivated by submerged culture at about 28° C. in a medium containing corn steep liquor, glucose, etc. The formation of uricase may be induced by known manner (e.g. A. H. Roush and A. J. Damnas, Science, 124, 125–126 (1956); M. F. Quetsch and W. F. Danforth, J. Cell. and Comp. Physiol., 64, 115–122, 123–130 (1964)). Thus, for example, at a stage before the stationary growthphase, glucose and uric acid are added to the culture to let adapt to or induce the formation of uricase. These cultivation of yeast and adaptation or induction of the uricase formation are well known per se in the art and do not constitute novel feature of the invention, it would be not necessary to make any further explanation thereabout.

After the cultivation the cells are collected by any suitable manner such as filtration or centrifugal separation.

The yeast cells are subsequently subjected to extraction with an aqueous solution of inorganic or organic salts, but it has been found that, in order to accomplish effective and selective extraction of uricase from yeast cells in the extraction stage, it is necessary to pretreat the cells with an aqueous solution of a salt under certain pH and ionic strength. This pretreatment is an essential feature of the present invention and is conducted by contacting the yeast cells with an aqueous solution of inorganic salts having an ionic strength higher than 2.0 and up to saturation (preferably higher than ½ saturation) and having a pH of from 3 to 8, preferably 4.5–7.5.

As for the inorganic salts, neutral salts are preferred although slightly acidic or slightly basic salts may also be used so far as the pH can be controlled to a value within the range specified above. The salts, however, should be selected from those of ammonium, alkaline metals and water soluble alkaline earth metals, because heavy metals tend to inactivate the enzyme. Preferable inorganic salts are, for example, ammonium sulfate, diammonium hydrogenphosphate, ammonium dihydrogenphosphate, ammonium chloride, sodium chloride, potassium chloride, calcium chloride, magnesium chloride, disodium hydrogenphosphate, sodium dihydrogenphosphate, sodium sulfate, etc.

The ionic strength of the solution to be applied in the pretreatment should be higher than 2.0. If the ionic strength is too low, the desired modification of the cells can not be effected. Although the salt concentration may be up to the saturation, it is preferable to employ a concentration of ½ saturation or higher.

The pH of the aqueous salt solution to be used in the pretreatment should be 3–8, preferably 4.5–7.5, most preferably about 7. If the pH is too high undesirable destruction of yeast cells would take place resulting in a loss of the enzyme at this stage, while if the pH is too low unactivation of uricase would occur.

The pretreatment should be conducted at a low temperature as possible. Thus the temperature should be lower than 15° C., preferably lower than 10° C.

Most typically, the pretreatment is conducted by immersing the yeast cells in the aqueous treating solution (e.g. about 5–10 volumes of the cells). The time for immersion may vary over a wide range depending upon the particular salt used and its ionic strength. However, generally, a satisfactory result is obtained with the immersion time of about 8–24 hours.

By this pretreatment the yeast cells are subjected to plasmolysis and other cell-structural modification, with a result that the effective and selective extraction of uricase in the subsequent extraction stage are facilitated.

Then the pretreated yeast cells are transferred to the extraction stage wherein the cells are suspended in an aqueous solution of inorganic or organic salt having an ionic strength lower than 1.0 and a pH of from 7.0 to 11.0 or the cells are subjected to dialysis against the said aqueous solution.

The solution to be used in this extraction stage is selected from those mentioned before as useful in the pretreatment. The salt to be used in the extraction may be different from or same as that used in the preceding pretreatment.

The important feature of the extraction step is that the ionic strength in the extraction medium is very low while pH is relatively high. Thus, the ionic strength at this extraction stage must be lower than 1.0 and preferably 0.02–0.04. The pH should be 7–11, preferably about 8. These specific conditions are important to extract uricase in such a form which can readily be purified in the subsequent purification operation which may be known per se. Outside the particular scope of condition, e.g. at an ionic strength higher than 1.0 it is possible to extract uricase, which however is associated with certain intracellular fragments (resulting from the cells) which are extremely difficult to separate from uricase by salting out, molecular sieve filtration, ion-exchanger treatment, etc. so that the resulting uricase would contain a substantial amount of these substances as contaminants and would show a specific activity of about 8.0 even after the maximal purification. In contrast thereto, when the extraction is conducted under such specific condition as described above and after the particular pretreatment explained before, uricase would be extracted in a free and completely soluble form so that the resulting uricase would be purified to such a high specific activity as 12.3, at which purity, the uricase preparation was shown to be ultracentrifugally homogeneous.

In carrying out the extraction, the pretreated cells are separated from the pretreatment solution by such means as centrifugal separation, and if desired washed with water, and then suspended in water about 3–5 times the weight of the wet cells. If necessary, a proper amount of the salt and an alkaline substance are added to adjust the ionic strength and pH within the range specified hereinbefore. Alternatively, the pretreating solution in which the yeast cells are still immersed is diluted with water until a desired ionic strength is attained. In any case, it must be so adjusted that the medium in and with which the extraction of uricase from cells is conducted would satisfy the above mentioned ionic strength and pH requirements.

For adjustment of pH, an alkaline substance such as borax, borax-boric acid buffer, trihydroxyaminomethane, veronal sodium salt, sodium carbonate, sodium hydroxide, etc. or aqueous ammonia is preferable to be used.

The extraction should be conducted also at a low temperature, e.g. below 15° C., preferably below 10° C. The time required for extraction would be about 10–48 hours although a longer time such as 48–72 hours may be used if desired.

As mentioned before the extraction may also be effected by dialysis. Thus, the pretreated cells are separated from the pretreating solution and are suspended in an aqueous solution placed in a dialyzing bag (e.g. cellophane bag) and of same ionic strength and pH condition as in the above mentioned extraction medium. The bag is then placed in a suitable liquid which would enable to maintain the solution within the bag at the ionic strength and pH specified before.

In any case (suspension method or dialysis method), uricase is almost completely eluted from the cells together with a small amount of other proteins. In case of the dialysis the eluted uricase would not pass through the bag so that it is accumulated in the bag in a concentration and purity much higher than that by the suspension method.

After this extraction, cells are separated from the extracting medium containing uricase by any suitable method such as centrifugal separation. The uricase as contained in said solution may be purified in any suitable manner known per se. It should be noted however that, according to this invention, uricase is extracted in a readily purifiable form so that its purification is easy.

Thus, for example, the uricase-containing solution separated from yeast is added with ammonium sulfate to be a 0.2 saturation so that most of the proteins precipitate, while uricase remains in the supernatant liquid. The precipitate is removed, for example, by filtration or centrifugation. Further addition of ammonium sulfate to the supernatant to a 0.5 saturation causes the substantially complete precipitation of uricase. Twice repetition of this procedure results in ten to twenty folds increase in the specific activity of the enzyme. To the precipitate, other purification procedures such as gel filtration, ion-exchanger chromatography, etc., may further be applied for further purification. The resulting uricase may be air-dried at a low temperature or freeze-dried after desalting by dialysis. These purification procedures are well known in the art and do not constitute a novel feature of the invention so that no further detailed explanation thereabout will be required.

The invention will be further described by referring to the following examples wherein all percentages are by weight unless otherwise specified. The activity of uricase is determined by decrease in absorbance of uric acid at 290 m$\mu$ when a predetermined amount of uric acid has been decomposed or oxidized by uricase at 25° C. and pH 8.5. Thus, one unit of uricase activity corresponds to the enzyme quantity which decomposes 1 $\mu$mole uric acid in one minute at 25° C. and at pH 8.5.

The specific activity as employed herein is the uricase activity per one unit of absorbancy of enzyme solution at 280 m$\mu$ per centimeter light path.

EXAMPLE 1

A strain of *Candida utilis* was subjected to submerged cultivation in a medium (pH 6.2) containing 5% glucose, 4% corn steep liquor and some inorganic salts for 36 hours at 28° C. The grown yeast cells were collected and immersed into a 0.5% glucose solution at 4° C. After overnight immersion, the cells were separated and suspended in a solution (pH 7.4) containing 3% glucose, 0.03% uric acid, 0.3% $Na_2HPO_4$ and a very small amount of other mineral salts. The suspension was aerobically shaken for 4 hours to induce the formation of uricase in the cells.

Then the yeast cells were collected by centrifugation and the wet cells (water content 75%) were suspended in 10 fold volumes of a 25% sodium chloride aqueous solution (pH 6.0, ionic strength 4.3) at 6° C. for 18 hours.

The pretreated cells were separated and suspended in an equal volume of M/50 borax solution (pH 9.2). The suspension was placed in a cellophane bag and then dialyzed against the changing borax solution of the same constituent at 6° C. for 56 hours.

The suspension within the bag was subjected to centrifugation to separate the cells which amounted about 78% by weight of the original cells. To the solution obtained was added ammonium sulfate to a 0.2 saturation and the resulting precipitate was discarded. To the supernatant further ammonium sulfate was added to a 0.5 saturation, whereby uricase was precipitated. The precipitate was dialyzed against a borate buffer solution of pH 8.4 for several days. The results are summarized in the following table.

TABLE

[Summary of extraction and partial purification of yeast uricase (one kg. by wet weight of yeast cells)]

| | pH | Activity per ml. | Total activity | Specific activity |
|---|---|---|---|---|
| Extract | 9.2 | 3.6 | 3,820 | 0.08 |
| After purification by salting out with ammonium sulfate and dialysis | 8.2 | 21.0 | 3,410 | 1.59 |

EXAMPLE 2

One kilogram of the uricase-induced yeast cells prepared as in Example 1 was immersed in five fold solution of ammonium sulfate of 0.45 saturation (pH 5.6, ionic strength 7.77, 6° C.) for 24 hours. The immersed cells were then separated and, after washing with water by aid of centrifugation to remove ammonium sulfate as much as possible, were suspended in ten volumes of M/50 $NaCO_3$ (the initial pH 10.4, ionic strength ca. 0.06). After 48 hours at 10° C., the suspension was centrifuged and the uricase in the supernatant was fractionally precipitated with ammonium sulfate between 0.2 and 0.55 of the saturation. The precipitate obtained was dissolved in a half volume of the original extract and was again precipitated by ammonium sulfate as above. The total uricase activity was 3670 and its specific activity was 1.02.

What we claim is:

1. A process for preparing uricase which comprises immersing uricase-containing yeast cells in an aqueous solution of an inorganic salt having an ionic strength higher than 2.0 and a pH of from 3 to 8 at a temperature below 15° C., and then subjecting the so-treated cells to extraction with an aqueous extracting solution of inorganic or organic salt having an ionic strength lower than 1.0 and a pH of from 7 to 11 at temperatures between 15° C. and 0° C., to elute uricase from the cells into the extracting solution.

2. A process as claimed in claim 1 wherein the inorganic salt to be used in the pretreatment and subsequent extraction are selected from ammonium sulfate, diammonium hydrogenphosphate, ammonium dihydrogenphosphate, ammonium chloride, sodium chloride, disodium hydrogenphosphate, sodium dihydrogenphosphate, sodium sulfate, potassium chloride, calcium chloride and magnesium chloride.

3. A process as claimed in claim 1 wherein the immersion is conducted for more than 8 hours.

4. A process as claimed in claim 1 wherein the aqueous extracting solution has an ionic strength of 0.02–0.04 and a pH of about 8.

References Cited

Roush et al.: Science, 124, 125–126 (1956).

Quetsch et al.: Journal of Cellular and Comparative Physiology, 64, 115–122, 123–130 (1964).

LIONEL M. SHAPIRO, *Primary Examiner.*